United States Patent [19]

Hirvi et al.

[11] 3,868,118

[45] Feb. 25, 1975

[54] MAGNETIC WORK HOLDER

[75] Inventors: Henry E. Hirvi, Paxton; Leon J. Gloshinski, Northboro, both of Mass.

[73] Assignee: Cincinnati Milacron-Heald Corp., Worcester, Mass.

[22] Filed: Nov. 23, 1973

[21] Appl. No.: 418,448

Related U.S. Application Data

[63] Continuation of Ser. No. 196,547, Nov. 8, 1971, abandoned.

[52] U.S. Cl. ............. 279/1 M, 51/237 R, 51/216 R
[51] Int. Cl. ............................................. B23g 3/152
[58] Field of Search ...... 279/1 M; 51/216 R, 236 R, 51/237 R

[56] References Cited

UNITED STATES PATENTS

| | | | |
|---|---|---|---|
| 2,787,874 | 4/1957 | Blood et al. | 51/236 R |
| 2,812,185 | 11/1957 | Snell | 279/1 M |
| 2,883,197 | 4/1959 | Gotha | 279/1 M |
| 2,924,917 | 2/1960 | Rice | 51/237 R |

*Primary Examiner*—Andrew R. Juhasz
*Assistant Examiner*—Leon Gilden
*Attorney, Agent, or Firm*—Norman S. Blodgett; Gerry A. Blodgett

[57] ABSTRACT

A magnetic work holder having a work driving means consisting of segmental conical shells associated with a coil for generating magnetic lines of flux.

4 Claims, 2 Drawing Figures

PATENTED FEB 25 1975　　　　　　　　　3,868,118

INVENTORS
HENRY E. HIRVI
BY LEON J. GLOSHINSKI

*Marvin L. Blodgett*
ATTORNEY

MAGNETIC WORK HOLDER

This is a continuation, of application Ser. No. 196,547 filed Nov. 8, 1971 now abandoned.

BACKGROUND OF THE INVENTION

In the operation of machine tools, there are many situations where it is necessary to rotate workpieces with a minimum of slippage between the workpiece and the driving means. A particular situation where this exists is in the case of the internal grinding of ball bearing races. It is common practice to support the race by means of shoes contacting the outer cylindrical surface and to drive it by the use of a rotatable platen contacting the radial end surface. In a situation where the ball bearing race is very thin and the end surface is small, it does not offer much surface for transfer of magnetic lines of flux. Furthermore, it may be desirable that scratching of the end surface be avoided, and such scratching is often experienced with a friction drive. In such cases, it is desirable to use a so-called "magnetic" driver, such as the driver as shown and described in the U.S. patent of Yingst et al. No. 2,933,862 which issued on Apr. 26, 1960. In the case of the very thin walled workpiece, however, this particular driver may be undesirable because of the distortion of the shell against the supporting shoes and an excessively high radial force component which appears as a braking torque. These and other difficulties experienced with the prior art devices have been obviated in a novel manner by the present invention.

It is, therefore, an outstanding object of the invention to provide a magnetic work holder capable of driving thin walled workpieces with very little slippage.

Another object of this invention is the provision of a magnetic driver for use in the internal grinding of a thin walled workpiece such as a ball bearing race.

A further object of the present invention is the provision of a magnetic driving means capable of exerting large magnetic forces despite the small area of contact with the workpiece.

With these and other objects in view, as will be apparent to those skilled in the art, the invention resides in the combination of parts set forth in the specification and covered by the claims appended hereto.

SUMMARY OF THE INVENTION

In general, the invention consists of a magnetic work holder for use in a macnine tool for generating a surface of revolution on a workpiece and having a spindle. The driver has a non-rotating annular electrical coil adapted to be mounted on an end of the spindle. A first ring is mounted on the spindle to receive an electromagnetic field of one polarity, and a second ring is mounted on the spindle concentrically of the first ring to receive a field of the opposite polarity. An annular lip is located around the axis of the rings in a plane substantially spaced axially therefrom, the lip consisting of four parts each subtending slightly less than 90°. Connectors join the first ring to diametrically opposite parts of the lip and connectors join the second ring to the remaining parts of the lip.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
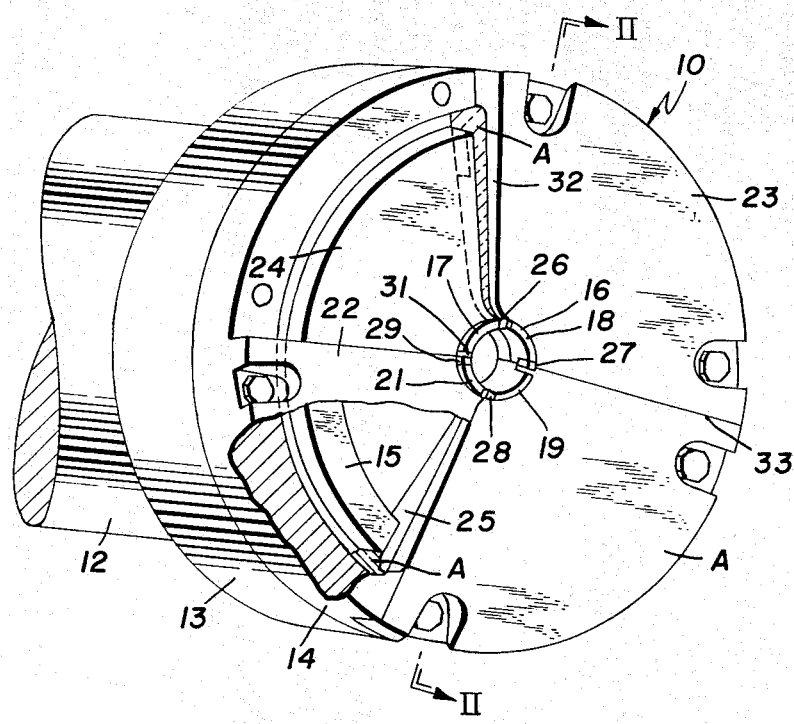
FIG. 1 is a perspective view with portions broken away of a magnetic work holder incorporating the principles of the present invention.
Figure 2:
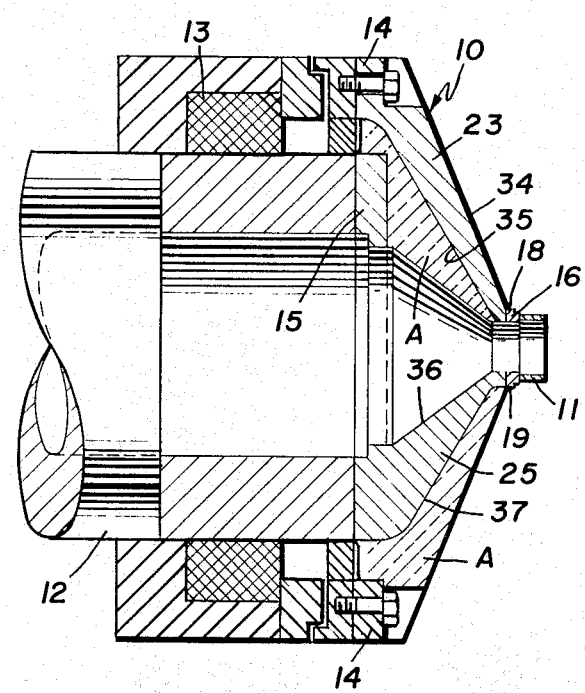
FIG. 2 is a sectional view of the holder taken on the line II—II of FIG. 1.

Referring to FIGS. 1 and 2, the magnetic workholder, indicated generally by the reference numeral 10, is shown as being constructed for use with an internal grinding machine for generating a surface of revolution on a workpiece 11. For the purpose of illustration, the workpiece is shown as the inner race of an anti-friction bearing, the race having a fairly thin wall. The internal grinding machine has a spindle 12 which is rotatable to drive the workpiece and is provided in the usual way with supporting shoes for the workpiece as well as an abrasive wheel and so on (not shown). A non-rotating annular electrical coil 13 is adapted to be mounted at one end of the spindle 12. A first ring 14 is mounted on the spindle 12 to receive an electromagnetic field of one polarity; in the preferred embodiment, this is selected as the north pole. The second ring 15 is mounted on the spindle concentrically of the first ring 14 to receive a field of the opposite polarity; in the preferred embodiment, this is selected as the south pole.

An annular lip 16 is located around the axis of the rings 14 and 15 in a plane substantially spaced axially therefrom. The lip consists of four parts 17, 18, 19, and 21, each subtending 90°. Two connectors 22 and 23 join the first ring 14 to diametrically-opposite parts 18 and 21 of the lip 16. Similarly, connectors 24 and 25 join the second ring 15 to the remaining parts 17 and 19, respectively, of the lip 16.

The parts 17, 18, 19, and 21 of the lip 16 are each provided with a wear-resistant insert 26, 27, 28, and 29, respectively, made, for instance, of carbide. These inserts have surfaces which are flush with the plane of the radial surface of the lip 16 which engages the end surface of the workpiece 11. Each of the inserts is separated by a substantial gap from the next adjacent part of the lip 16 other than the part with which it is associated; for instance, as is obvious in the FIG. 1, a slot 31 lies between the hardened metal insert 29 attached to the part 21 of the lip and the part 17. The rings 14 and 15, the parts 17, 18, 19, and 21 of the lip 16, and the connectors 22, 23, 24, and 25 are all formed of a magnetic material and the spaces between the connectors and rings are filled with a non-magnetic material, such as epoxy; this material is indicated by the letter A throughout the drawings.

Each connector is defined by two axial planes extending at an angle of approximately 90° radially from the axis of the rings and lips. For instance, in FIG. 1, such planes are indicated by the reference numerals 32 and 33 and serve to define the connector 23. Each connector is also defined by two conical surfaces having their vertices on the said axis in the neighborhood of the lip; the generatrices of the conical surfaces of a given connector lie at a substantial acute angle. For instance, as is obvious in FIG. 2, the connector 23 is subtended by conical surfaces 34 and 35, while the connector 25 associated with the inner ring 15 is defined by similar conical surfaces 36 and 37. If the conical surfaces 34, 35, 36, and 37 were extended to their vertex, this would lie on the axis of the lip 16 in the vicinity of the point where the lip contacts the workpiece 11. The angle subtended by the outer surface 37 of the connector 25 as well as its associate connector 24 is an angle somewhat smaller than the angle subtended by the inner conical surface 35 of the connectors 23 and 22. It can be seen, then, that the connectors 22 and 23 and the parts 18 and 21 associated with the first ring 14 are electrically insulated by the non-magnetic material A from the connectors 24 and 25 and the parts 17 and 19 associated with the second or inner ring 15.

The operation of the invention will now be readily understood in view of the above description. Electrical power is introduced to the coil 13 in the usual way by means of commutating devices (not shown). The magnetic lines of flux extend from the coil 13 through an air gap into the ring 14 and pass through the connectors 22 and 23 to their respective lip parts 21 and 18 where they are concentrated because of the thinner cross-section in that area. They emerge from the radial surface of the lip 16 into the workpiece 11. They extend circumferentially around the work-piece approximately 90° and then leave the workpiece through the parts 17 and 19. Next they flow through the connectors 24 and 25 to the inner ring 15 where they again pass through an air gap and enter the coil and its associated armature. In this way, despite a thin-walled workpiece which would normally be difficult to use with a magnetic driver, sufficient lines of force are concentrated in the workpiece to bring about the desired holding effect. This is brought about by the fact that the cross-section of each of the connectors and lips is reduced in the area close to the workpiece, so that the lines of force are concentrated in that area and serve to hold the workpiece against the radial surface of the lip 16 without distortion. This produces very little slippage between the magnetic work driver 10 and the workpiece 11; the result of this is that, not only is the workpiece not subject to being scratched, but also the lip of the work holder is not subject to wear. Therefore, it does not need to be replaced as frequently as was true with prior art devices.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A magnetic work holder for use in a machine tool having a rotatable spindle, comprising:
   a. an annular electro-magnetic coil adapted to be mounted adjacent the spindle,
   b. a first ring mounted on the coil to receive an electromagnetic field of one polarity,
   c. a second ring mounted on the coil concentrically of the first ring to receive a field of the opposite polarity,
   d. an annular lip located around the axis of the rings in a plane substantially spaced axially therefrom, the lip consisting of at least four parts subtending substantial angles, each part of the lip being closely associated with a hardened metal insert for engagement with the surface of a workpiece, and each insert being separated by a substantial gap from the next adjacent part of the lip other than the one with which it is associated,
   e. connectors joining the first ring to diametrically opposite parts of the lip, and
   f. connectors joining the second ring to the remaining parts of the lip, the rings, lip, and connectors being formed of a magnetic material and the spaces between the connectors and rings being filled with a non-magnetic material, each connector being defined by two axial planes extending at a substantial angle radially from the axis of the rings and lips and by two conical surfaces having their vertices on the said axis in the neighborhood of the lip and the generatrices of the conical surfaces of a given connector lying at a substantial acute angle, the outer conical surface of the connectors joining the second ring to the lip subtends an angle somewhat less than that subtended by the inner conical surface of the connectors joining the first ring to the lip, the connectors and parts of the lip associated with the first ring being electrically insulated by the non-magnetic material from the connectors and parts of the lip associated with the second ring.

2. A magnetic work holder as recited in claim 1, wherein the lip consists of exactly four parts, each subtending 90°.

3. A magnetic work holder as recited in claim 1, wherein the planes defining each connector extend at an angle of 90°.

4. A magnetic work holder as recited in claim 1, wherein the non-magnetic material is epoxy plastic.

* * * * *